United States Patent
Watanabe et al.

(10) Patent No.: US 7,044,886 B2
(45) Date of Patent: May 16, 2006

(54) SHIFT CONTROL APPARATUS FOR AUTOMATIC TRANSMISSION

(75) Inventors: Kiyoshi Watanabe, Anjo (JP); Yasushi Sato, Anjo (JP); Yuji Aoyagi, Utsunomiya (JP); Koichi Miyamoto, Toyota (JP); Tooru Matsubara, Toyota (JP)

(73) Assignee: Aisin AW Co., Ltd., Anjo-Shi (JP)

( * ) Notice: Subject to any disclaimer, the term of this patent is extended or adjusted under 35 U.S.C. 154(b) by 113 days.

(21) Appl. No.: 10/900,264

(22) Filed: Jul. 28, 2004

(65) Prior Publication Data

US 2005/0064992 A1  Mar. 24, 2005

(30) Foreign Application Priority Data

Jul. 28, 2003 (JP) .............................. 2003-202313

(51) Int. Cl.
*B60K 41/04* (2006.01)
(52) U.S. Cl. ..................................... 477/111
(58) Field of Classification Search ................ 477/111, 477/112, 113
See application file for complete search history.

(56) References Cited

U.S. PATENT DOCUMENTS

| 5,109,818 | A | * | 5/1992 | Yoshida | 123/319 |
| 5,833,572 | A | * | 11/1998 | Leising et al. | 477/113 |
| 6,478,713 | B1 | * | 11/2002 | Runde et al. | 477/107 |
| 6,726,596 | B1 | * | 4/2004 | Kresse et al. | 477/116 |
| 6,736,756 | B1 | * | 5/2004 | Kwon | 477/98 |

* cited by examiner

*Primary Examiner*—Dirk Wright
(74) *Attorney, Agent, or Firm*—Bacon & Thomas, PLLC (57) ABSTRACT

The invention prevents a clutch from being damaged and ensures a driver of a feeling of responsiveness even if an accelerator pedal is depressed when an automatic transmission is shifted from a drive range to a non-drive range. If neutral has been selected and if an accelerator has been operated, an ECT_ECU performs normal throttle control until lapse of a first period of time following operation of the accelerator exceeds a second threshold. Within a second period of time following the first period of time, the ECT_ECU executes a program including the regulation of throttle opening at less than the amount corresponding to degree of accelerator depression in normal control, until lapse of a predetermined time subsequent to detection of the shift.

19 Claims, 5 Drawing Sheets

FIG. 1

|      | C1 | C2 | C3 | C4 | B1 | B2 | B3 | B4 | F0 | F1 | F2 | F3 |
|------|----|----|----|----|----|----|----|----|----|----|----|----|
| P    |    |    |    |    |    |    |    |    |    |    |    |    |
| R    |    |    | O  |    | ◎  |    | O  |    |    | O  |    |    |
| N    |    |    |    |    |    |    |    |    |    |    |    |    |
| 1st  | O  |    |    | ◎  |    |    |    | ◎  | O  |    |    | O  |
| 2nd  | O  |    |    | ◎  |    | ◎  | O  |    | O  | O  | O  |    |
| 3rd  | O  |    | O  | ◎  | ◎  |    | △  |    | O  | O  |    |    |
| 4th  | O  | O  | △  | ◎  |    |    | △  |    | O  |    |    |    |
| 5th  | △  | O  | O  |    | O  |    | △  |    |    |    |    |    |
| 6th  | △  | O  |    |    | △  | O  | △  |    |    |    |    |    |

○ ENGAGED
◎ ENGAGED AT THE TIME OF ENGINE BRAKING
△ ENGAGED BUT IRRELEVANT TO POWER TRANSMISSION

SHIFT CONTROL APPARATUS FOR AUTOMATIC TRANSMISSION

CROSS-REFERENCE TO RELATED APPLICATION

This application claims priority under 35 USC 119 of Japanese Patent Application No. 2003-202313 filed on Jul. 28, 2003, the teachings of which, including the specification, drawings and abstract, are incorporated herein by reference in their entirety.

BACKGROUND OF THE INVENTION

1. Field of the Invention

The invention relates to a shift controller ("shift control apparatus") for an automatic transmission. More specifically, the invention relates to a shift controller for preventing shock during a shift of an automatic transmission from a drive range to a non-drive range, for example, when a garage shift is executed.

2. Description of the Related Art

Automatic transmissions installed in vehicles include multi-speed automatic transmissions and continuously variable automatic transmissions. A multi-speed automatic transmission is composed of a gear-type speed change mechanism and a fluid coupling such as a torque converter or the like. The fluid coupling serves to connect the multi-speed automatic transmission to an engine. The speed change mechanism may be a planetary gear-type deceleration mechanism for switching between a plurality of power transmission paths. For example, the multi-speed automatic transmission may be designed to automatically switch from one of the power transmission paths to another on the basis of accelerator opening and vehicle speed, that is, to automatically change the gear ratio (running speed stage). In the multi-speed automatic transmission, a new gear stage is established by engaging or releasing friction elements such as clutch elements, brake elements, and one-way clutch elements in a predetermined manner.

In general, a vehicle having an automatic transmission as described above is provided with a shift lever to be operated by a driver. Responsive to operation of the shift lever, a shift position (e.g., a reverse position, a neutral position, or a forward position) is set.

In order to move a vehicle from a garage for road travel or to put the vehicle into a garage after a trip, a shift from the parking (P) position to the reverse (R) position for moving the vehicle in reverse or a shift from a neutral (N) position to a forward (D) position or to the reverse (R) position, a so-called garage shift is made.

In making a garage shift, the automatic transmission is shifted from a drive position (the forward (D) position or the reverse (R) position) to a non-drive position (the neutral (N) position) in some cases, which creates various problems.

Japanese Patent Application Laid-Open No. HEI 10-61461 discloses a control apparatus for an automatic transmission of a vehicle which can prevent the vehicle from moving and enhance the durability of a frictional engagement device, irrespective of the rotational speed of a drive power source, in shifting from a drive (running) range to a non-drive range. This control apparatus controls the driving power source, the automatic transmission, and the shifting device. The drive power source is provided with an output increasing/reducing mechanism that is controlled by operating an accelerator pedal. The automatic transmission is connected to the output side of the drive power source through a hydraulically operated frictional engagement device disposed in a torque transmission path of the automatic transmission. The shifting device shifts the automatic transmission from a drive range to a non-drive range. When the automatic transmission is shifted from a drive range to a non-drive range by operation of the shifting device, the frictional engagement device is released so that the torque transmission path is disconnected. The control apparatus further comprises output control means. Before a predetermined period has elapsed after the shifting device has shifted the automatic transmission from a drive range to a non-drive range, the output control means suppresses increase in output from the output increasing/reducing mechanism even in the case where the accelerator pedal has been depressed to increase output from the drive power source. In use, this control apparatus for the automatic transmission, before the predetermined period has elapsed after the shifting device has completed the shift from a drive range to a non-drive range, the output increasing/reducing mechanism is restrained from increasing output and increase in the torque to be transmitted to the frictional engagement device is limited, even if the accelerator pedal is depressed to increase output from the drive power source.

Japanese Patent Application Laid-Open No. HEI 5-141284 discloses a control apparatus for a vehicular automatic transmission which suppresses the drag of a hydraulically operated frictional engagement device resulting from the movement of a shift lever from a drive range to a non-drive range, and which raises the RPM of an engine even if the shift lever has been shifted into a non-drive range. In this vehicular automatic transmission, if the shift lever is shifted from a drive range to a non-drive range, the hydraulically operated frictional engagement device that has been engaged is released, and a power transmission path of the transmission is disconnected. The control apparatus comprises engine rotational speed detecting means, fuel cut means, shift operation detecting means, timing means, and fuel cut prohibiting means. The engine rotational speed detecting means detects the rotational speed of the engine. The fuel cut means suppresses a rise in engine rotational speed by stopping the supply of fuel in a non-drive range if the rotational speed of the engine exceeds a predetermined set value with the shift lever having been shifted into the non-drive range. The shift operation detecting means detects movement of the shift lever from a drive range to a non-drive range. The timing means measures the time that has elapsed since detection of movement of the shift lever from a drive range to a non-drive range by the shift operation detecting means. The fuel cut prohibiting means prohibits the fuel cut means from stopping the supply of fuel if the elapsed time measured by the timing means exceeds a predetermined value.

In the control apparatus for a vehicular automatic transmission disclosed in HEI 5-141284, the timing means measures the time elapsed since movement of the shift lever from a drive range to a non-drive range is detected by the shift operation detecting means. If the elapsed time exceeds the predetermined value, the fuel cut prohibiting means prohibits the supply of fuel from being stopped in the non-drive range. Accordingly, the fuel cut means, for stopping the supply of fuel in the non-drive range if the speed of the engine exceeds the predetermined set value, restrains the hydraulically operated frictional engagement device from being dragged as a result of movement of the shift lever from the drive range to the non-drive range. In addition, if the elapsed time exceeds the predetermined value, the supply of fuel is prohibited from being stopped, so that the rotational speed of the engine can be raised above the predetermined set value in the non-drive range such as the P range or the N range. Therefore, it is possible to check the operation of the engine and to charge a battery. Further, since the engine racing, i.e., raising the rotational speed of the engine, is in the non-drive range, a driver is prevented from wrongly believing that the engine is malfunctioning.

However, the control apparatuses disclosed in the aforementioned two publications cannot solve a significant problem as follows. Before a predetermined period has elapsed after a shift of the automatic transmission from a drive position to a non-drive position, the increase in engine output is suppressed even if the accelerator pedal has been operated to increase output from the driving power source. Therefore, even if the driver depresses the accelerator pedal with the intention of increasing the RPM of the engine, the engine does not operate as intended by the driver and the driver thus feels a sense of incongruity.

SUMMARY OF THE INVENTION

Accordingly, it is an object of the invention to provide a shift controller for an automatic transmission which, when shifted from a drive range to a non-driven range, prevents the vehicle from motion, causes no damage to an input clutch, and ensures the driver of the best operating sensation.

In a first aspect the present invention provides control means for limiting opening of the throttle to a predetermined degree during a second period of time beginning at expiration of a first period of time and ending a predetermined time after the detection of the shift, said first period of time beginning with detection of accelerator operation.

After the period has elapsed, the opening of the throttle is regulated until a second period has elapsed, that is, until the possibility of generation of a centrifugal hydraulic pressure is eliminated. Thus, within the first period, the throttle is opened in association with the opening of the accelerator with high priority assigned to the driver demand. Thereafter, however, the opening of the throttle is regulated until the second period has elapsed, i.e., the throttle is regulated so that its opening does not reach the opening corresponding to the degree of accelerator pedal depression. As a result, the shift control apparatus ("shift controller") of the present invention, when the automatic transmission has been shifted from a driven range for "state" to a non-driven range, prevents a vehicle from drive, causes no damage to the input clutch, and which ensures a driver of the best operating sensation.

More specifically, the second period begins with expiration of the first period and ends a predetermined time after the detection of the shift and the first period of time begins with detection of accelerator operation and ends a predetermined period of time after detection of the shift.

In another aspect of the invention, if the automatic transmission is shifted from a drive range (or "state") to a non-drive range, a frictional engagement element, e.g., an input clutch, is changed from its engaged state to its released state. In this process, until no centrifugal hydraulic pressure is generated relative to the engagement element, the opening of the throttle is controlled (regulated) relative to the opening of the accelerator. Thus, the rotary speed of the engine is restrained from rising even if hydraulic fluid tending to produce a centrifugal hydraulic pressure remains in the piston chamber of the input clutch. Because no centrifugal hydraulic pressure is generated, the input clutch is not engaged. Accordingly, it is possible to prevent the vehicle from moving forward or backward, contrary to the intention of the driver, and to prevent the input clutch from burning out.

According to still another aspect of the invention, if the automatic transmission is shifted from a drive range to a non-drive range, the throttle is controlled by preventing it from opening within a period in which a centrifugal hydraulic pressure may be generated. Thus, the rotary speed of the engine is restrained from rising even if a hydraulic fluid, which tends to generate a centrifugal hydraulic pressure, remains in the piston chamber of the actuator of the input clutch. Therefore, no centrifugal hydraulic pressure is generated, and the input clutch is not engaged.

According to still another aspect of the invention, if the automatic transmission is shifted from a drive range to a non-drive range, the supply of fuel to the engine is stopped for a period in which a centrifugal hydraulic pressure may be generated. Thus, the rotary speed of the engine is restrained from rising even if hydraulic fluid tending to generate a centrifugal hydraulic pressure remains in the piston chamber of the actuator of the input clutch. Therefore, no centrifugal hydraulic pressure is generated, and the input clutch is not engaged.

In yet another aspect, the present invention provides a method for control of a throttle of an engine in a vehicle equipped with an automatic transmission, the method comprising:

detecting a shift of an automatic transmission from a drive range to a non-drive range; and limiting opening of the throttle to a predetermined degree during a second period of time beginning at expiration of a first period of time and ending a predetermined time after the detection of the shift, said first period of time beginning with detection of accelerator operation.

DETAILED DESCRIPTION OF A PREFERRED EMBODIMENT

Hereinafter, a preferred embodiment of the invention will be described with reference to the drawings. In the following description, like components are denoted by like reference symbols. Those components which are denoted by the same reference symbol are identical in name and function as well. Accordingly, a detailed description thereof will not be repeated.

Hereinafter, a power train of a vehicle including a control apparatus 1000 in accordance with the present embodiment will be described with reference to the drawings. The automatic transmission to be described in the present embodiment has a planetary gear-type deceleration mechanism that is provided with a torque converter 200 as a fluid coupling.

Figure 1:
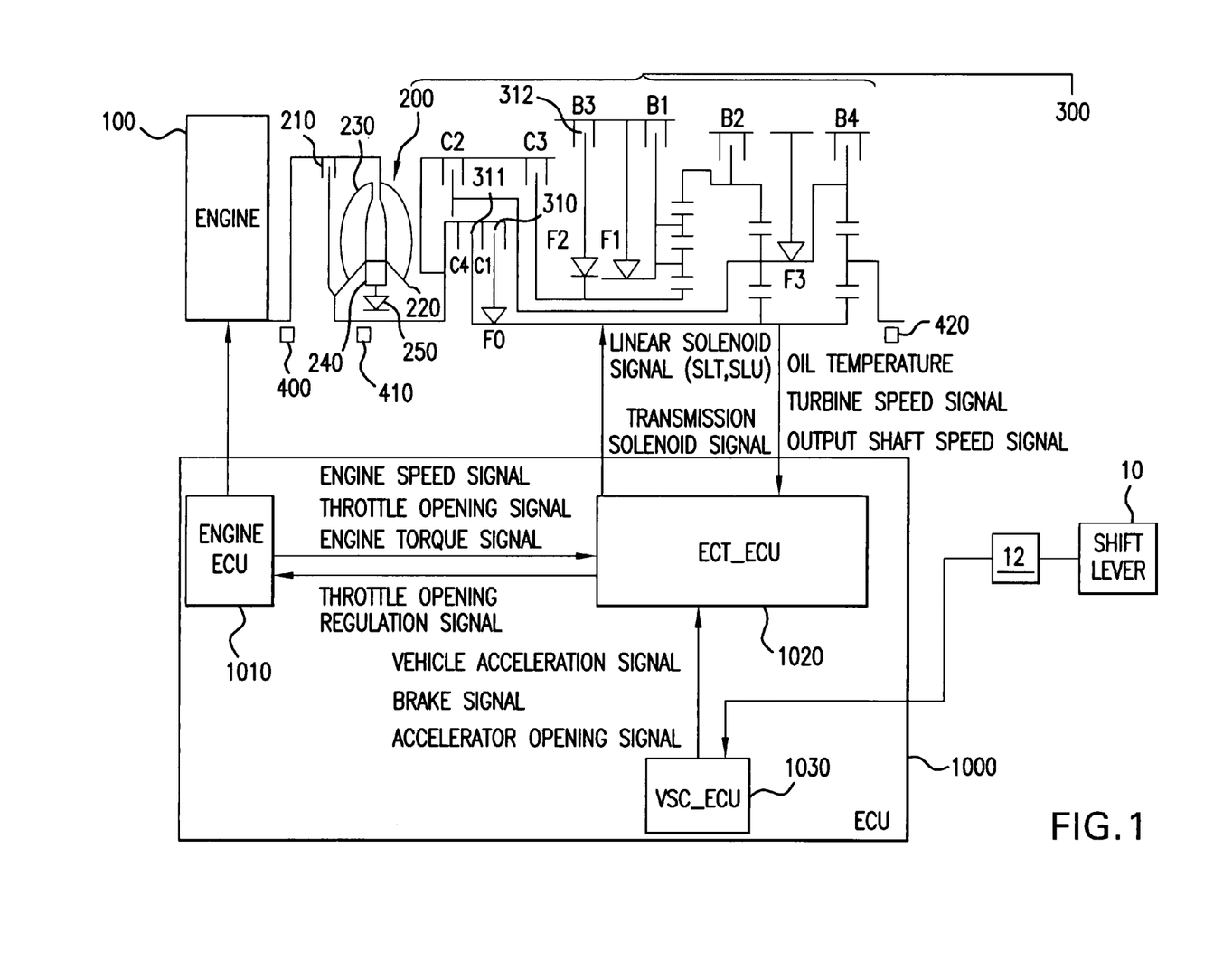
FIG. 1 is a block diagram of an automatic transmission in accordance with an embodiment of the invention.

As shown in FIG. 1, the power train of the vehicle is composed of an engine 100, a torque converter 200, and an automatic transmission 300. An output shaft of the engine 100 is connected to an input shaft of the torque converter 200 whereby the engine 100 is coupled to the torque converter 200 through a rotational shaft. Accordingly, output shaft speed NE of the engine 100 which is detected by an engine speed sensor 400, is equal to speed of the input shaft of the torque converter 200, i.e., torque converter pump speed.

The torque converter 200 is composed of a lock-up clutch 210 for directly coupling the input shaft to the output shaft, a pump impeller 220 on the side of the input shaft, a turbine impeller 230 on the side of the output shaft, and a stator 240 having a one-way clutch 250 and serving to amplify torque. The torque converter 200 is connected to the automatic transmission 300 by a rotational shaft. A turbine speed sensor 410 detects an output shaft speed NT (turbine speed NT) of the torque converter 200. An output shaft speed sensor 420 detects an output shaft speed NOUT of the automatic transmission 300.

A lock-up relay valve selectively supplies/discharges a hydraulic pressure to/from the engagement side or the release side, for operation of the lock-up clutch 210. The piston of the lock-up clutch 210 divides the interior of the torque converter into a release-side oil chamber for releasing the lock-up clutch, formed between the lock-up piston and the front cover, and an engagement-side oil chamber for engaging the lock-up clutch 210, formed between the lock-up piston and the turbine runner. A hydraulic pressure is supplied from a hydraulic circuit in a valve body to the release-side oil chamber or to the engagement-side oil chamber.

Figure 2:
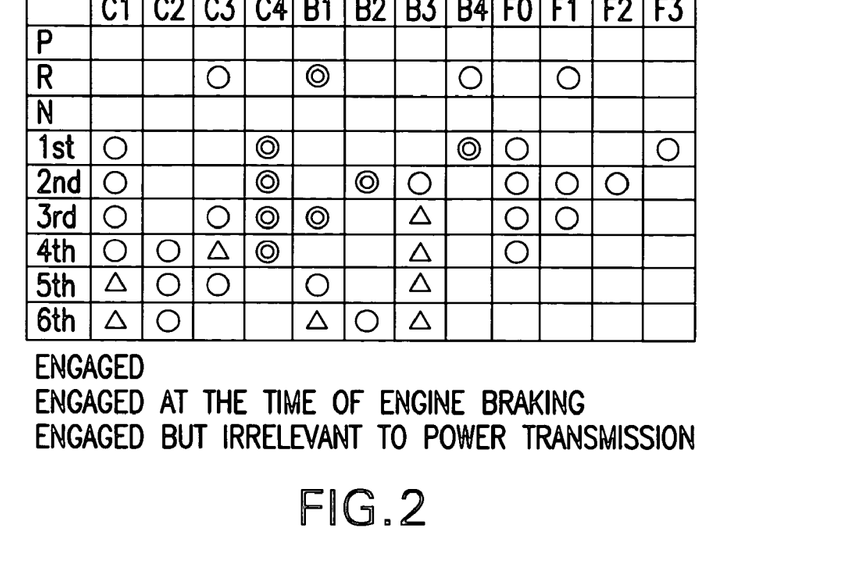
FIG. 2 is an operation chart of the automatic transmission shown in FIG. 1.

FIG. 2 is a chart of operations of the automatic transmission 300. The operation chart in FIG. 2 shows whether each of the frictional elements, namely, clutch elements (C1 to C4), brake elements (B1 to B4), and one-way clutch elements (F0 to F3) is to be engaged or released for each gear stage. In first speed, for starting the vehicle, the clutch (C1) and the one-way clutches (F0 and F3) are engaged. Among these clutch elements, the clutch element C1 is referred to as an input clutch 310 and is also referred to as a forward clutch. As is apparent from the operation chart in FIG. 2, the input clutch 310 is always engaged for all shift speeds in moving the vehicle forward, namely, a shift speed other than parking (P), reverse (R), or neutral (N). Therefore, if a shift is made from a forward (D) shift speed to neutral (N), the input clutch (C1) 310 is always changed from its engaged state to its released state. Further, if a shift is made from the reverse (R) position to the neutral (N) position, the clutch C3 is changed from its engaged state to its released state.

If the automatic transmission is thus changed from a driven state to its non-driven state, at least one of the engaged clutches is released. Although the following description deals with the input clutch (C1) 310, the same holds true for the clutch C3. A hydraulic circuit relating to the input clutch (C1) 310 will be described in detail later.

The controller 1000 for controlling the power train includes an engine ECU 1010 for controlling the engine 100, the Electronic Controlled Automatic Transmission (ECT)_ECU 1020 for controlling the automatic transmission 300, and a Vehicle Stability Control (VSC)_ECU 1030.

A signal indicating a turbine speed NT and a signal indicating an output shaft speed NOUT are input to the ECT_ECU 1020 from the turbine speed sensor 410 and the output shaft speed sensor 420, respectively. A signal indicating engine speed NE, as detected by the engine speed sensor 400, and a signal indicating throttle opening, as detected by a throttle position sensor, are input to the ECT_ECU 1020 from the engine ECU 1010.

These speed sensors face teeth of gears fitted to the input shaft of the torque converter 200, the output shaft of the torque converter 200, and the output shaft of the automatic transmission 300, respectively. The speed sensors are also capable of detecting slight rotation of the input shaft of the torque converter 200, the output shaft of the torque converter 200, and the output shaft of the automatic transmission 300, respectively. Each of the speed sensors is designed as a sensor using a magneto resistor, which is generally referred to as a semiconductor sensor.

Furthermore, a signal indicating vehicle acceleration, as detected by a G sensor, and a signal indicating that a brake of the vehicle is engaged are input to the ECT_ECU 1020 from the VSC_ECU 1030. The VSC_ECU 1030 receives a brake control signal from the ECT_ECU 1020 and controls the brake of the vehicle responsive thereto.

Position of shift lever 10 is detected by a sensor 12 which sends a signal to the VSC_ESU 1030 which, based thereon, generates an accelerator opening signal and transmits it to ECT_ECU 1020. A throttle opening regulation signal is transmitted from the ECT_ECU 1020 to the engine ECU 1010.

In the controller 1000 (control apparatus in accordance with the present invention), if the automatic transmission 300 is changed from a drive state to a non-drive state, i.e., if a shift is made from a forward (D) speed or from reverse (R) position to a non-driven range, e.g., neutral (N), the ECT_ECU 1020 transmits a throttle opening regulation signal to the engine ECU 1010 so as to prevent generation of a centrifugal hydraulic pressure, on the basis of an accelerator opening signal input from the VSC_ECU 1030.

During normal control, the engine ECU 1010 controls the throttle opening to correspond to the an accelerator opening. However, upon receiving the throttle opening regulation signal, the engine ECU 1010 regulates the throttle such that the opening thereof does not reach the throttle opening corresponding to the accelerator opening. The throttle is regulated so that its opening is 30–70% of throttle opening which would be set corresponding to accelerator operation, absent the limiting by the control means of the present invention. Alternatively, the accelerator opening signal may be input directly to the engine ECU 1010 or the ECT_ECU 1020 instead of being transmitted via the VSC_ECU 1030. In addition, it is not necessary that the ECU 1000 be composed of the engine ECU 1010, the ECT_ECU 1020, and the VSC_ECU 1030.

Figure 3:
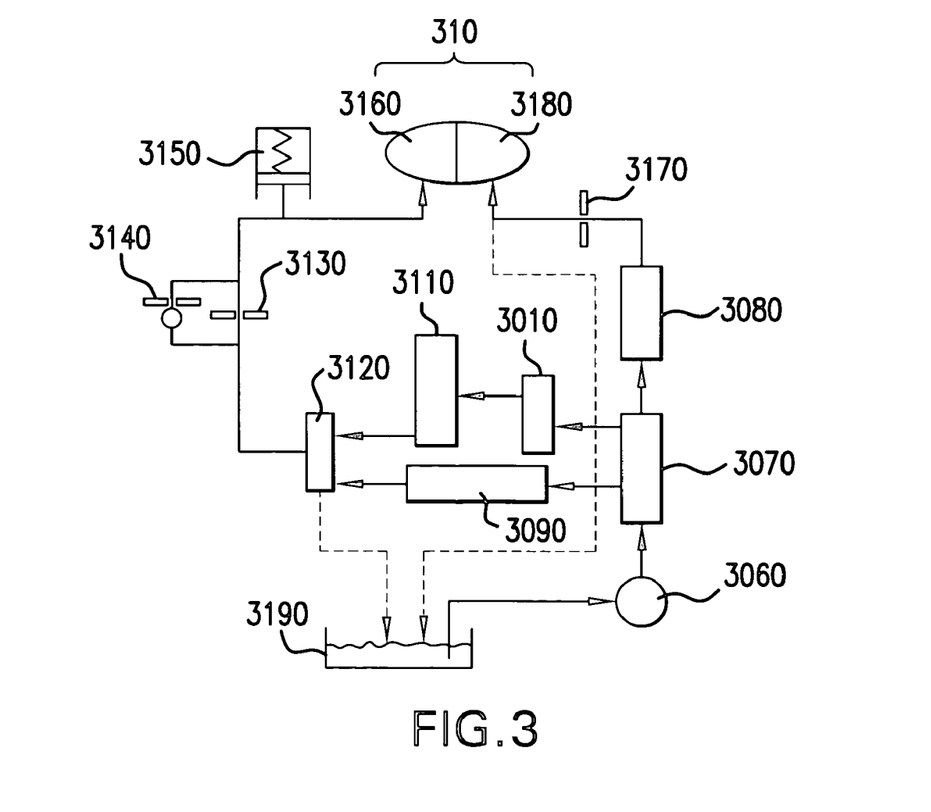
FIG. 3 is a hydraulic circuit diagram.

Referring to FIG. 3, the hydraulic circuit for the input clutch (C1) 310 will be described in detail. As shown in FIG. 3, the hydraulic circuit supplies a hydraulic fluid from an oil pan 3190 to a primary regulator valve 3070 by means of an oil pump 3060. A line pressure is supplied from the primary regulator valve 3070 to a secondary regulator valve 3080, a manual valve 3090, and a solenoid modulator valve 3010. The hydraulic fluid, whose pressure has been adjusted to a predetermined hydraulic pressure by the secondary regulator valve 3080, is supplied to a C1 release chamber 3180 of the input clutch (C1) 310 via a lubricating orifice 3170.

On the other hand, the hydraulic fluid routed from the primary regulator valve 3070 to the manual valve 3090 is supplied to a clutch control valve 3120. The hydraulic fluid that has been routed from the primary regulator valve 3070 to the solenoid modulator valve 3010 is supplied to the clutch control valve 3120 via a linear solenoid 3110. The hydraulic fluid that has been routed to the clutch control valve 3120 is supplied to a C1 engagement chamber 3160 of the input clutch (C1) 310 via a C1 application orifice 3130. A C1 accumulator 3150 is disposed between the C1 application orifice 3130 and the C1 piston chamber 3160. When the hydraulic fluid is discharged from the C1 piston chamber 3160, it flows through the clutch control valve 3120 via a C1 drain orifice 3140 and is returned to the oil pan 3190. The hydraulic fluid drained from the C1 release chamber 3180 is also returned to the oil pan 3190.

Figure 4:
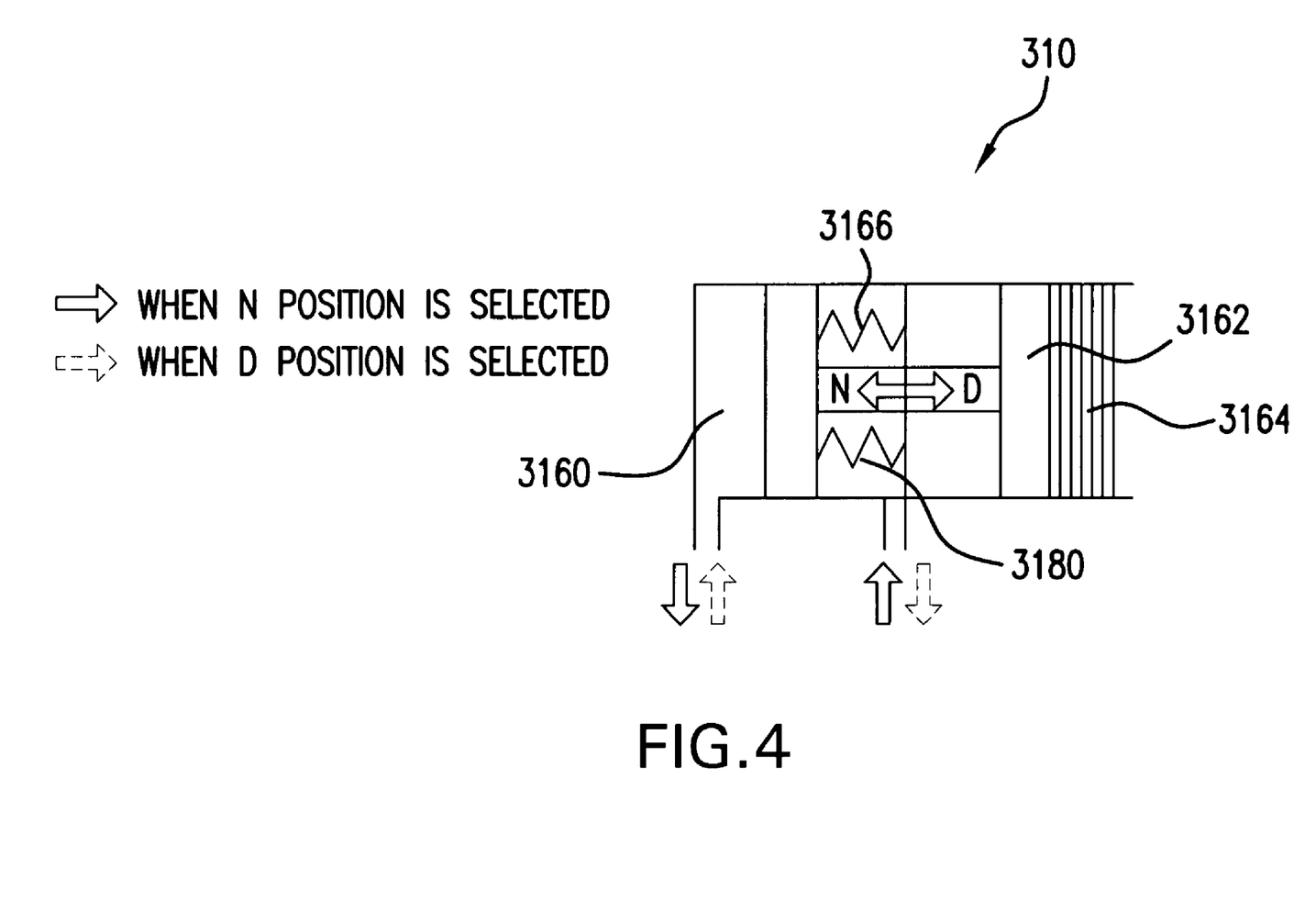
FIG. 4 is another hydraulic circuit diagram.

Details of the input clutch (C1) 310 shown in FIG. 3 are illustrated in FIG. 4 which shows the flow of the hydraulic fluid when the neutral (N) position is selected and the flow of the hydraulic fluid when the forward (D) position is selected. As shown in FIG. 4, the input clutch (C1) 310 includes the C1 engagement chamber 3160, the C1 release chamber 3180, and a piston return spring 3166. The hydraulic fluid for exerting a force in the direction pressing C1 piston 3162 against a clutch C1 (frictional member) 3164 is accumulated in the C1 piston chamber 3160. The hydraulic fluid for causing the C1 piston 3162 to move away from (release) the C1 clutch 3164 is supplied to the C1 release chamber 3180. A force is applied by the piston return spring 3166 to bias the C1 piston 3162 away from the C1 clutch 3164.

When the forward (D) position is selected while the vehicle is stopped, the hydraulic fluid is supplied to the C1 piston chamber 3160 and discharged from the C1 release chamber 3180. The C1 piston 3162 is thereby pressed against the C1 clutch 3164, so that the input clutch (C1) 310 is engaged. On the other hand, if a shift is made from the forward (D) position to the neutral (N) position, the hydraulic fluid that has been supplied to the C1 piston chamber 3160 is drained and is supplied to the C1 release chamber 3180, so that the C1 piston 3162 moves away from the C1 clutch 3164.

In the input clutch (C1) 310 as described above, if a shift is made from the forward (D) position (a driven state) to the neutral (N) position (a non-driven state), while the vehicle is stopped, the hydraulic fluid is drained from the C1 engagement chamber 3160 instead of being supplied thereto, whereas the hydraulic fluid is supplied to the C1 release chamber 3180 instead of being drained therefrom. The hydraulic fluid is discharged from the C1 piston chamber 3160 to the oil pan 3190 through the C1 drain orifice 3140.

At this time, if the engine 100 starts rotating with the hydraulic fluid remaining in the piston chamber 3160, a centrifugal force is applied to the hydraulic fluid remaining in the piston chamber 3160 by the rotation of the engine 100. Until the C1 release chamber 3180 is filled with hydraulic fluid, the hydraulic fluid remaining in the C1 piston chamber 3160 generates, responsive to the centrifugal force, a force in a direction forcing the C1 piston 3162 to press against the C1 clutch 3164. As a result, the input clutch (C1) 310 is brought to a state almost engaged wherein the vehicle may start moving forwards, or the C1 clutch 3164 may be burned out.

FIGS. 3 and 4 illustrate the case where a shift is made from the forward (D) position to the neutral (N) position using the input clutch (C1) that is engaged when the forward (D) position is selected. For a shift from the reverse (R) position to the neutral (N) position, the same clutch structure (same as the input clutch (C1)) is adopted for the clutch C3 which is engaged when the reverse (R) position is selected.

Figure 5:
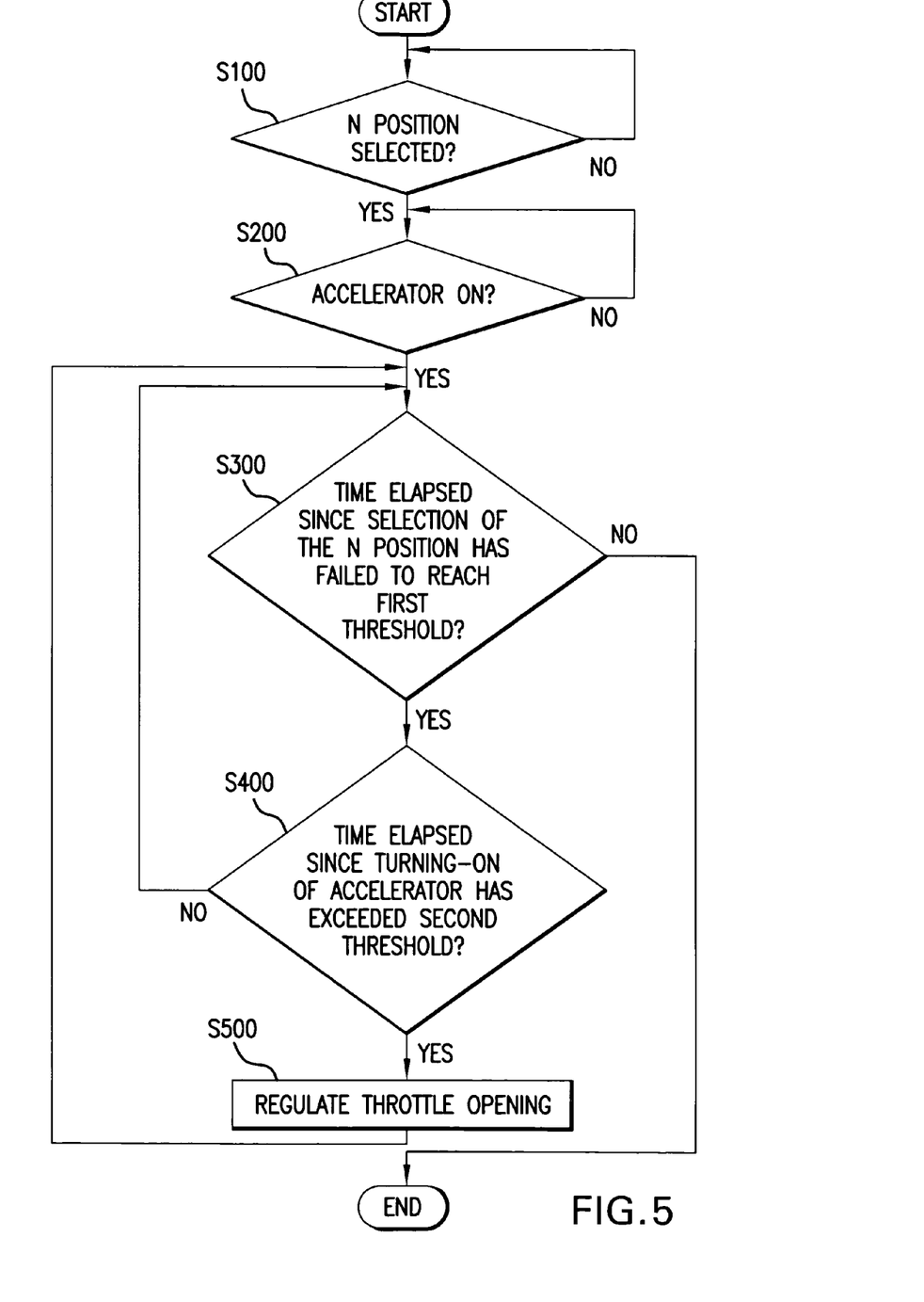
FIG. 5 is a flowchart of the control program executed by the ECU of the embodiment of FIG. 1.

Referring to FIG. 5, the control program executed by the controller 1000 in accordance with the present embodiment will be described. Note that the program illustrated by the flowchart in FIG. 5 is executed by the ECT_ECU 1020 in the controller 1000. It is to be noted, however, that the ECU for executing this program is not limited to the ECT_ECU 1020.

In step 100 (hereinafter referred to as "S"), the ECT_ECU 1020 determines whether or not the neutral position has been established, namely, whether or not a shift has been made from the forward (D) position or the reverse (R) position to the neutral (N) position. A neutral start switch (NSW) makes this determination, and the ECT_ECU 1020 detects the determination. If the neutral position is established(YES in S100), the process proceeds to step S200. If not, (NO in S100), the process returns to S100 and waits until the neutral position is detected.

In S200, the ECT_ECU 1020 determines whether or not the accelerator has been depressed, i.e., whether or not "the accelerator has been turned on". If the accelerator has been turned on (YES in S200), the process proceeds to S300. If not (NO in S200), the process returns to S200 and waits until the accelerator is depressed.

In S300, the ECT_ECU 1020 determines whether or not the time elapsed since the neutral position was established (turned from off to on) has reached a first threshold. If the time elapsed since establishment of the neutral position has not yet reached the first threshold (YES in S300), the process proceeds to S400. If not (NO in S300), the process is terminated.

In S400, the ECT_ECU 1020 determines whether or not the time elapsed since the turning-on of the accelerator has exceeded a second threshold. The second threshold is set such that a centrifugal force resulting from the rotation of the engine 100 does not cause the C1 clutch 3164 to be engaged, i.e., to enter a power transmission state. If the time elapsed time since turning-on the accelerator has exceeded the second threshold (YES in S400), the process proceeds to S500. If not (NO in S400), the process returns to S300.

In S500, the ECT_ECU 1020 executes control (regulation) of the throttle opening. More specifically, the ECT_ECU 1020 transmits a throttle opening regulation signal to the engine ECU 1010, which then regulates the throttle opening. Unlike normal control, throttle regulation control prevents the throttle from opening as normal to an extent corresponding to opening of the accelerator.

Operation of a vehicle equipped with the ECT_ECU 1020 in accordance with the present embodiment will now be described for a case wherein the driver depresses the accelerator pedal immediately after moving the shift lever from the forward (D) position or the reverse (R) position to the neutral (N) position.

Figure 6:
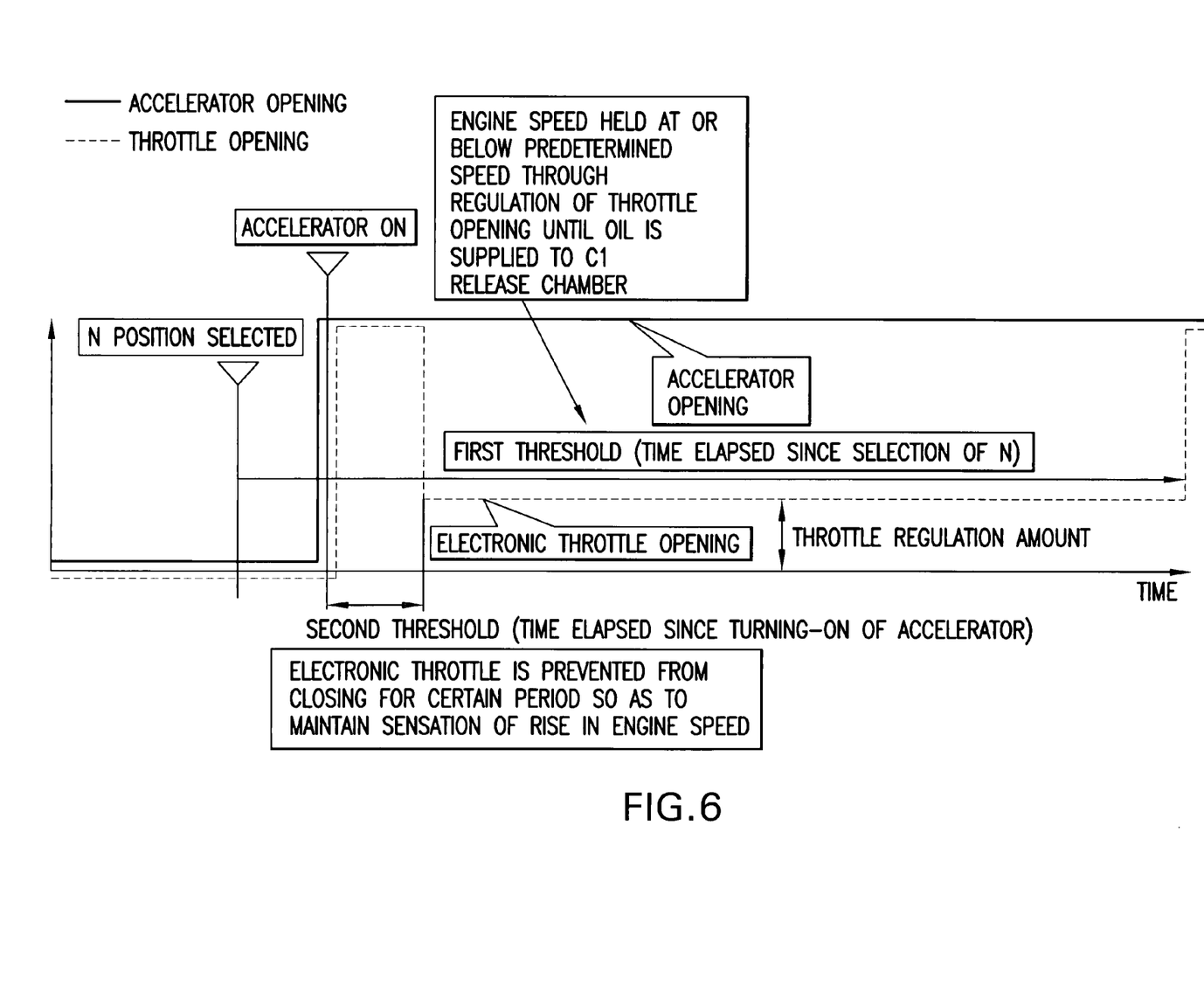
FIG. 6 is a timing chart showing the operations of an automatic transmission in accordance with the embodiment of the invention of FIG. 1.

In FIG. 6, the abscissa represents time, a solid line represents accelerator opening and an alternating long and short dash line represents throttle opening. The first threshold is set for the time elapsed since the neutral position was turned from off to on, whereas the second threshold is set for the time elapsed since the accelerator was operated (turned on), e.g., by depression of an accelerator pedal.

If the neutral position has been turned from off to on (YES in S100) and if the accelerator has been operated (YES in S200), it is determined whether or not the time elapsed since the neutral position was established has failed to reach the first threshold.

If the elapsed time since the neutral position was turned on has failed to reach the first threshold (YES in S300) and if the time elapsed since the turning-on of the accelerator has failed to reach the second threshold (NO in S400), the throttle opening is not regulated. That is, as shown in FIG. 6, if the driver depresses the accelerator after a shift to the neutral position, control of throttle opening in correspondence with accelerator opening is continued until the time elapsed since depression of the accelerator exceeds the second threshold.

That is, for a certain period beginning with the time when the driver depresses the accelerator to the time corresponding to the second threshold, the throttle is controlled so as to prevent forcible closure thereof.

On the other hand, if the time elapsed since a shift to the neutral position has not yet reached the first threshold (YES in S300) and if the time elapsed since depression of the accelerator has exceeded the second threshold (YES in S400), throttle opening is regulated (S500). At this point, as shown in FIG. 6, because the time elapsed since the operation of the accelerator has reached or exceeded the second threshold, the opening of the throttle is controlled as to be smaller than that corresponding to the opening of the accelerator in the earlier control. This smaller amount is referred to as the throttle regulation amount.

That is, even if the driver greatly depresses the accelerator, the throttle is not greatly opened, and the rotary speed of the engine 100 is restrained from rising. In this manner, the C1 release chamber 3180 is filled with hydraulic fluid, and the speed of the engine 100 is held equal to or lower than a predetermined speed due to the regulation of the throttle opening until the hydraulic fluid is discharged from the C1 piston chamber 3160. Thus, generation of a centrifugal hydraulic pressure can be suppressed, and burnout or the like of the C1 clutch 3164 can be prevented.

As previously described, according to the present invention, if the driver operates the accelerator after the issuance of a command to shift from a drive range of the vehicle (i.e., forward (D) or reverse (R)) to a non-driven range of the vehicle (i.e., neutral (N)), control of throttle opening in correspondence with accelerator opening is continued for a period to the second threshold. If the time elapsed since the operation of the accelerator exceeds the second threshold, throttle opening is regulated until the time elapsed since the shift to neutral exceeds the first threshold. In this case, the opening of the throttle is controlled to be smaller than usual relative to the opening of the accelerator. Thus, when the driver shifts the shift lever to the neutral (N) position and then operates the accelerator, the rotary speed of the engine rises only for a period up to the second threshold. Afterwards, throttle opening regulation is started so that the opening of the throttle becomes smaller relative to the opening of the accelerator and the rotary speed of the engine is prevented from rising. By control in this manner, a sense that the engine speed is rising in response to depression of the accelerator pedal by the driver is ensured. Also, by regulating the opening of the throttle, before the C1 clutch is engaged due to a centrifugal force resulting from a rise in engine speed, the generation of a centrifugal hydraulic pressure by the hydraulic fluid remaining in the C1 piston chamber can be obviated, and burnout of the C1 clutch can be prevented.

A stopping of the supply of fuel to the engine 100 may be utilized instead of the aforementioned throttle opening regulation.

Even before the second threshold is exceeded, the regulation of throttle opening may be started immediately if the speed of the engine has reached a predetermined rate due to depression of the accelerator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A shift control apparatus for control of an automatic transmission and throttle of an engine in a vehicle, comprising:
   shift detection means for detecting a shift of the automatic transmission from a drive range to a non-drive range; and
   control means for limiting opening of the throttle to a predetermined degree during a second period of time beginning at expiration of a first period of time and ending a predetermined time after the detection of the shift, said first period of time beginning with detection of accelerator operation.

2. The shift control apparatus according to claim 1, wherein
   said control means controls to open the throttle in correspondence with a detected operation of the accelerator during the first period.

3. The shift control apparatus according to claim 2, wherein
   the automatic transmission has a frictional engagement element that is engaged by a hydraulic actuator when the vehicle starts moving, and
   wherein the predetermined time is set on the basis of a period of time required until generation of centrifugal hydraulic pressure in the hydraulic actuator ceases.

4. The shift control apparatus according to claim 3, wherein
   said control means prevents the throttle from fully opening during the second period.

5. The shift control apparatus according to claim 4, wherein
   said control means stops supply of fuel during the second period.

6. The shift control apparatus according to claim 3, wherein
   the control means stops supply of fuel upon lapse of the first period until the second period has elapsed.

7. The shift control apparatus according to claim 2, wherein
   said control means prevents the throttle from opening fully during the second period.

8. The shift control apparatus according to claim 7, wherein
   said control means stops supply of fuel during the second period.

9. The shift control apparatus according to claim 2, wherein
   said control means stops supply of fuel during the second period.

10. The shift control apparatus according to claim 1, wherein
    the automatic transmission has a frictional engagement element that is engaged by a hydraulic actuator when the vehicle starts moving, and
    wherein the predetermined time is set on the basis of a period of time required until generation of centrifugal hydraulic pressure in the hydraulic actuator ceases.

11. The shift control apparatus according to claim 10, wherein
    said control means prevents the throttle from fully opening during the second period.

12. The shift control apparatus according to claim 11, wherein
said control means stops supply of fuel during the second period.

13. The shift control apparatus according to claim 10, wherein
said control means stops supply of fuel during the second period.

14. The shift control apparatus according to claim 1, wherein
said control means prevents the throttle from fully opening during the second period.

15. The shift control apparatus according to claim 14, wherein
said control means stops supply of fuel during the second period.

16. The shift control apparatus according to claim 1, wherein
said control means stops supply of fuel during the second period.

17. The shift control apparatus according to claim 1 wherein said control means, during the first period of time, controls opening of the throttle at a first degree in accordance with accelerator operation and, during the second period of time, limits opening of the throttle to a second degree, significantly less than said first degree.

18. The shift control apparatus according to claim 17 wherein said second degree of opening is 30–70% of said first degree of opening.

19. A method for control of a throttle of an engine in a vehicle equipped with an automatic transmission, said method comprising:
detecting a shift of an automatic transmission from a drive range to a non-drive range; and
limiting opening of the throttle to a predetermined degree during a second period of time beginning at expiration of a first period of time and ending a predetermined time after the detection of the shift, said first period of time beginning with detection of accelerator operation.

* * * * *